UNITED STATES PATENT OFFICE.

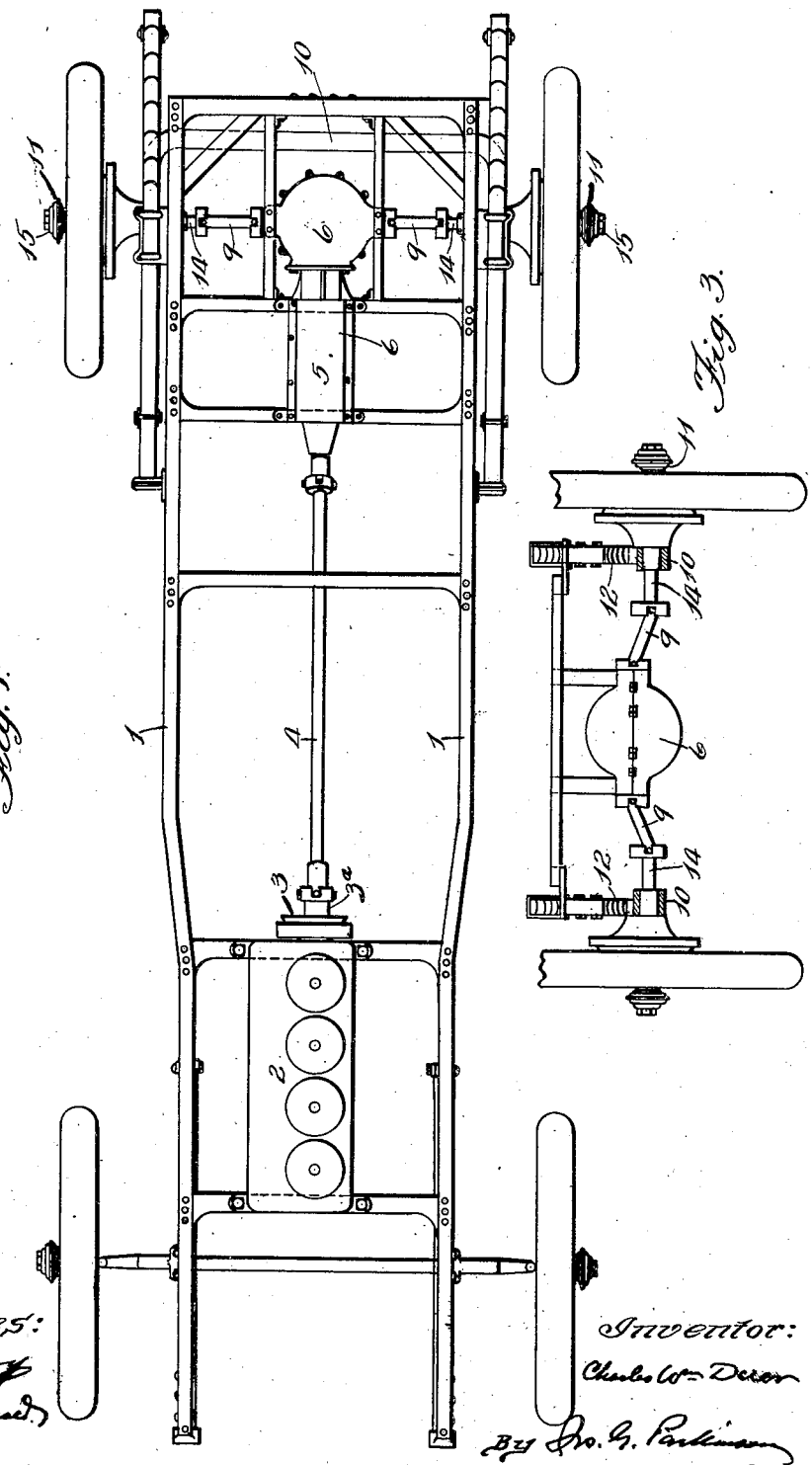

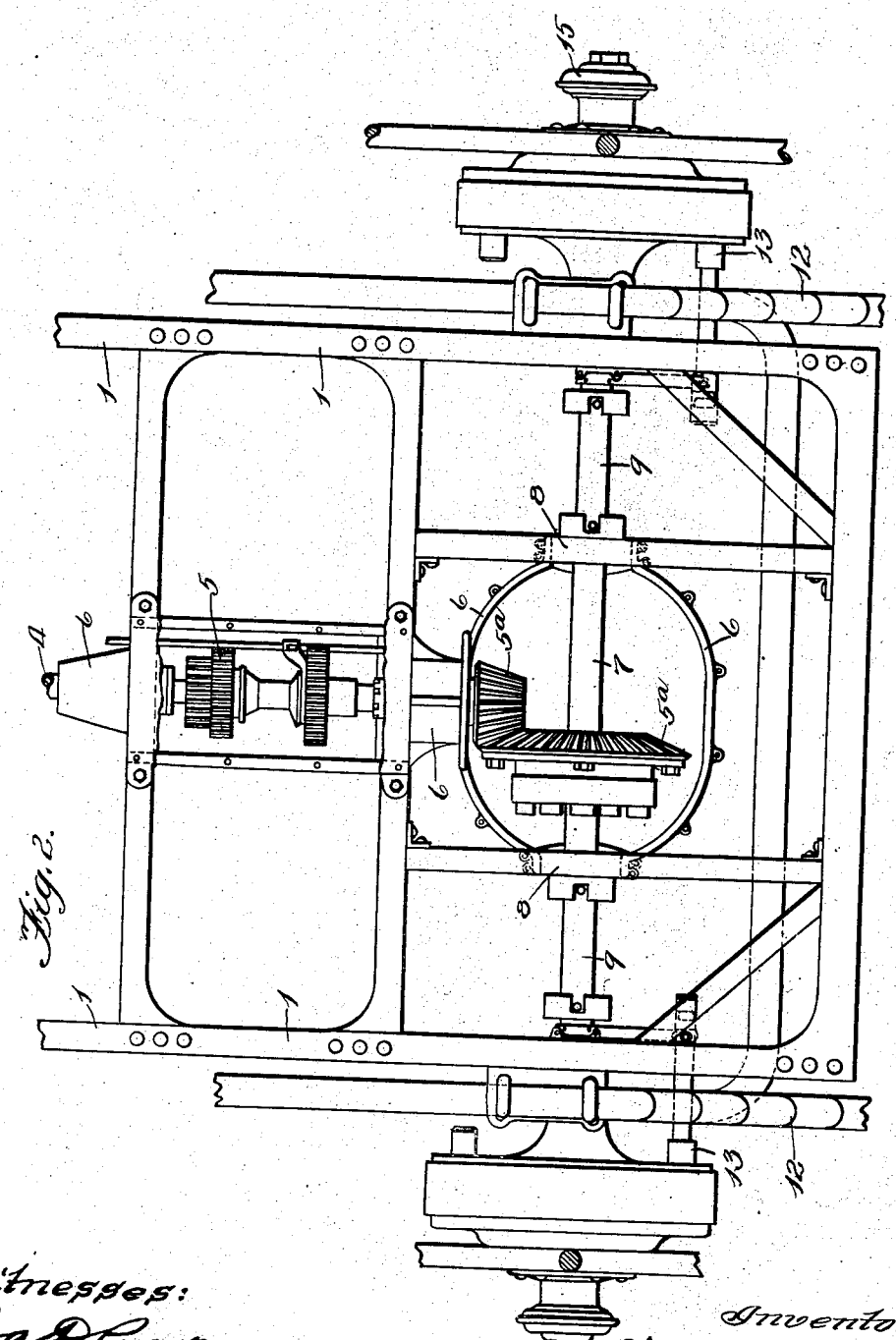

CHARLES WILLIAM DUER, OF CHICAGO, ILLINOIS.

AUTOMOBILE.

997,975.  Specification of Letters Patent.  Patented July 18, 1911.

Application filed February 21, 1910. Serial No. 545,032.

*To all whom it may concern:*

Be it known that I, CHARLES WILLIAM DUER, a citizen of the United States, residing at Chicago, in the county of Cook and State of Illinois, have invented certain new and useful Improvements in Automobiles, of which the following is a specification.

In a popular type of automobiles at the present day the engine, clutch and transmission are built as one unit, having three points of support upon the chassis, and the rear bevel drive forms a second unit assembled within a housing interposed between the two sections of the rear axle. In another popular form the transmission is detached from the first unit and assembled with the bevel drive in the housing between the sections of the rear axle, while in still a third form the engine and clutch constitute one unit, the bevel drive a second unit, and the transmission still a third, interposed between the other two and independently supported upon the chassis. Among the faults of the first are too much weight in front and difficulty in access to the clutch and transmission owing to the proximity of the engine, while the second system throws too much weight on the rear axle without any spring support, and with the third the units are inconveniently scattered. A further fault, common to all machines which have a gear housing interposed between sections of a rear or main axle, is also lack of clearance, since any such housing necessarily drops considerably below the plane of the axle and the distance between its lowest point and the ground determines the maximum available clearance.

In my present invention I propose to employ but two units and to mount neither upon the main axle, which may therefore, and should be, rigid from end to end, giving it and the whole structure more clearance, provision of course being made for driving the wheels independently of the axle, and the points of attachment being such as to avoid breaking torsion; for instance, three as has for a long time been customary.

In the drawings—Figure 1 is a top plan view of a chassis and apparatus disposed thereon according to my invention, in the best way now known to me; Fig. 2 is an enlarged plan of the rear part of said machine, showing the transmission and bevel drive in their housing on the chassis above the main axle, and Fig. 3 is a rear elevation explanatory of the relation between chassis, springs, main axle and drive.

Referring now to said drawings, the numeral 1 represents the chassis and 2 is the engine of any desired number of cylinders and supported upon the chassis in any approved manner. A clutch, 3, is preferably built in with the engine, as a unit, and reaching rearwardly from a short shaft 3ª coupled to the engine shaft by this clutch is a universally jointed shaft, 4, connecting with the transmission, 5, on the chassis above the rear axle. This shaft has two joints, one at front and the other at rear, the latter connecting with the spindle of the transmission.

The bevel drive, 5ª, is immediately in rear of the transmission and mounted in the same housing, 6, or one practically the same, constituting in effect a single unit, the second of the two employed in my machine. The short spindle, 7, of this drive is mounted in bearings, 8, on the chassis and turns two universal jointed shafts, 9, by which the rear wheels are driven. These wheels are mounted on a continuous axle which does not revolve. This axle, 10, may be tubular, and will be bent or bulged out in a practically horizontal plane from the line of the long wheel bearings, 11, at its end, thus insuring full clearance to the machine. Springs, 12, will be interposed between the axle and chassis, and brakes, 13, will be provided upon the wheels, as shown.

The journals of the axle are tubular and within them turns a short spindle 14 driven by the aforesaid shaft 9 and rigidly connected at its outer end to the hub of the wheel at 15, to drive the latter. Suitable means will be provided to compensate for the varying distance between chassis and axle due to the yielding of the springs. For instance the universal joints of the shafts 9 will usually suffice to take up the necessary play.

Having thus described my invention and the best manner now known to me in which it may be carried out, what I claim and desire to secure by Letters Patent of the United States is:

1. The combination, in an automobile, of a chassis, the power and actuating mechanism arranged thereon in two exclusive units, one of which is located at the front and comprises as salient feature the engine, and the other, located at the rear, comprises similarly the transmission and driving gear, a universally jointed shaft connecting said units, the intervening space being otherwise clear, a continuous, non-rotating main axle located beneath the rear part of the chassis, driving wheels journaled on the ends of said axle, a pair of universally jointed shafts connecting the driving gear with the hubs of said wheels, and cushioning springs interposed between the chassis and main axle.

2. The combination, in an automobile, of a chassis, the transmission and driving gear supported as a single unit on the rear part of the chassis, the engine and clutch supported as an independent unit on the front part of the chassis, a universally jointed shaft connecting the latter unit with the former, a continuous, non-rotative main axle located beneath the rear part of the chassis, driving wheels journaled on the ends of said axle, a pair of universally jointed shafts connecting the driving gear with the hubs of said wheels, and cushioning springs interposed between the chassis and main axle.

3. The combination, in an automobile, of a chassis, the transmission and driving gear supported as a single unit on the rear part of the chassis, the engine and clutch supported as an independent unit on the front part of the chassis, a universally jointed shaft connecting the latter unit with the former, a continuous, non-rotative main axle bent or bulged out in practically a horizontal plane from its wheel bearings and located beneath the first unit, driving wheels journaled on the ends of said axle, a pair of universally jointed shafts connecting the driving gear of the first unit with the hubs of said wheels, and cushioning springs interposed between the chassis and main axle.

CHARLES WILLIAM DUER.

Witnesses:
M. W. CANTWELL,
JOSEPH G. PARKINSON.